United States Patent [19]
Fournier et al.

[15] 3,664,195
[45] May 23, 1972

[54] ARTICLE TESTING APPARATUS

[72] Inventors: Daniel Fournier, Roseville; Urho A. Strang, Livonia, both of Mich.

[73] Assignee: Dan Bee Corporation, Southfield, Mich.

[22] Filed: May 11, 1970

[21] Appl. No.: 35,968

[52] U.S. Cl. .......................... 73/432 R, 33/199 B, 209/80
[51] Int. Cl. ............................................. G07c 5/06
[58] Field of Search .................. 73/432 R, 167; 209/88 R, 80; 33/199 B

[56] References Cited

UNITED STATES PATENTS

| | | | |
|---|---|---|---|
| 1,359,943 | 11/1920 | Wilhelm | 33/199 B |
| 1,424,370 | 8/1922 | Morey | 209/80 |
| 3,537,184 | 11/1970 | Hearn | 33/199 R |

Primary Examiner—S. Clement Swisher
Attorney—Irving M. Weiner

[57] ABSTRACT

An apparatus for detecting missing threads in internally threaded nuts. A scissor-like probe element is translated into the internally threaded hole of the nut and travels the full length of the nut. If any threads are missing, the probe fingers will expand and energize a reject solenoid to eject the improperly fabricated nut. The probe unit is actuated by a spring-loaded slide driven by a gear reduction motor and a bellcrank wheel. A missing thread gives rise to a pivotal motion of one of the probe elements, and this motion is detected by an adjacent electrical contact detecting device. The testing operation is completely automatic and the stopping and starting of the probe unit may be controlled by a parts detection switch mounted in a track in front of the probe unit.

6 Claims, 4 Drawing Figures

INVENTORS
DANIEL FOURNIER &
URHO A. STRANG
BY
*Irving M. Weiner*
ATTORNEY

INVENTORS
DANIEL FOURNIER &
URHO A. STRANG

BY
*Irving M. Weiner*
ATTORNEY 3,664,195

ARTICLE TESTING APPARATUS

The present invention relates to an apparatus for detecting the shape and/or the dimensions of an article to be tested. In particular, the present invention may be used for testing the shape or dimensions of internal cavities or apertures, such as those which may include threaded portions.

Although there are several conventional devices and machines for detecting the external shape and/or the external dimensions of articles to be tested, there has been a long-felt need for an apparatus which will quickly and accurately detect the shape and/or the dimensions of a cavity or aperture in various articles. Heretofore, there has been no satisfactory apparatus or machine which was capable of very rapidly and accurately detecting missing threads in internally threaded portions of an article, such as a conventional internally threaded hexagon nut.

The present invention fills the above-mentioned long-felt need in this area of technology and at the same time avoids the problems and disadvantages of the conventional apparatus. In particular, a preferred embodiment of the present invention will accurately inspect hexagon nuts for missing threads at a production rate of 60 nuts per minute, or 3,600 nuts per hour, at 100 percent efficiency and accuracy. Furthermore, this embodiment of the present invention requires very little attention by an operator once the automatic testing and cycling procedure has been initiated.

SUMMARY

The present invention provides an apparatus for detecting the shape and/or the dimensions of an article to be tested, and includes a first probe element and a second probe element. There is also included a first device for interconnecting the first and second probe elements so that the probe elements may pivot with respect to each other. The first device is disposed between a first portion of the first probe element and a second portion of the first probe element. The first device is also disposed between a first portion of the second probe element and a second portion of the second probe element. The apparatus also includes first means disposed adjacent the second portion of the first probe element for detecting the position of the second portion of the first probe element. The apparatus also includes second means disposed adjacent the second portion of the second probe element for detecting the position of the second portion of the second probe element. Third means are provided for producing translatory motion between the article to be tested and the probe elements so that the first portions of the probe elements make substantially translatory contact with the portions of the article to be tested. Any pivotal movement or change in position of either of the first portions of the probe elements about the first device produces a corresponding movement or change in position of its associated second portion which is detected by its associated first or second means.

The present invention also provides an automatic apparatus for detecting missing threads in internally threaded nuts. The apparatus includes a probe unit upon which first and second probe elements are mounted. A first portion of the first probe element includes a first partial external thread. A first portion of the second probe element includes a second partial external thread. The first partial external thread and the second partial external thread form a complete thread when the first portion of the first probe element is juxtaposed relative to the first portion of the second probe element. There is also provided first means, such as a first adjustable electrical contact detecting device, which is disposed adjacent a second portion of the first probe element for detecting the position of the second portion of the first probe element. The apparatus also includes second means, such as a second adjustable electrical contact detecting device, which is disposed adjacent a second portion of the second probe element for detecting the position of the second portion of the second probe element. The apparatus also is provided with third means which includes a spring-loaded slide, a gear reduction motor and a bellcrank wheel. The probe unit is capable of being actuated to translate relative to the internally threaded nut by a spring-loaded slide which is driven by the bellcrank wheel and the gear reduction motor. The complete thread on the probe elements makes translatory contact with the entire internal threaded portion of the nut in response to the probe unit being moved by the third means.

DETAILED DESCRIPTION OF A PREFERRED EMBODIMENT

Figure 1:
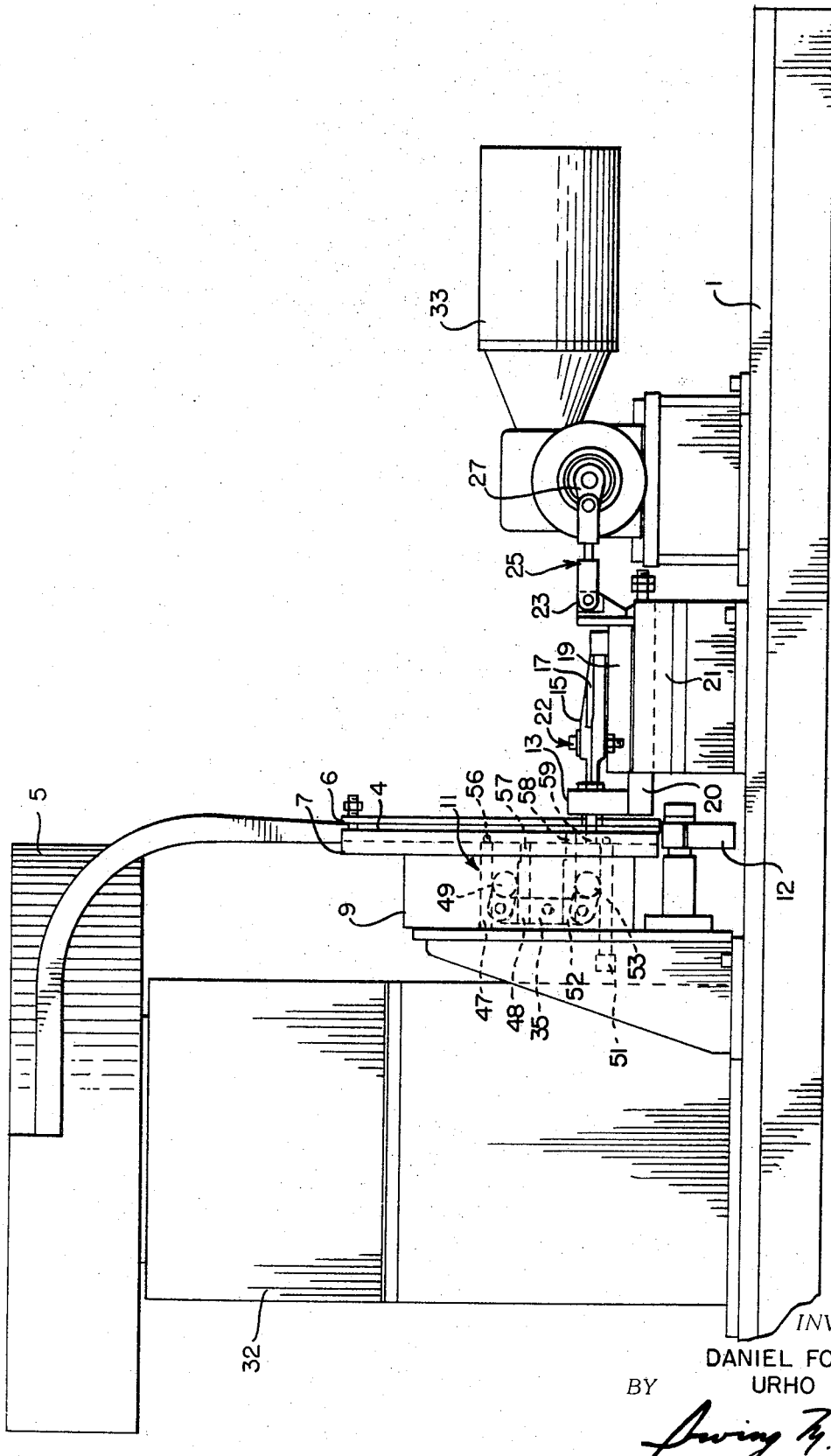
FIG. 1 is a side elevational view of a preferred embodiment of an automatic nut thread testing machine according to the present invention.

With reference to FIG. 1, there is shown an apparatus according to the present invention in the form of a nut thread testing machine which includes a base 1, a superstructure 3, a vibratory hopper 5, and a hardened steel track 7. The upper end of the hardened steel track 7 is operatively connected with the vibratory hopper 5.

The lower end of the hardened steel track 7 is connected to and communicates with an escapement mechanism 11. The lower portion of the hardened steel track 7 extends along a vertical face of a housing 9. The escapement mechanism 11 is positioned in the interior of the housing 9 and includes several racks, gears and links which will be referred to in greater detail hereinafter.

The escapement mechanism 11 is located interior to the housing 9, and is composed of four gear racks 47, 48, 51, and 52, and two pinion gears 49 and 53. The two pinion gears 49 and 53 are interconnected by means of a pivoted link 55. Metal stop blocks 56, 57, 58, and 59 are affixed to the ends of the gear racks 47, 48, 51, and 52.

Adjacent to the steel track 7 is a guide plate 6. An eject chute 12 is located at the bottom end of the steel track 7 and is connected to the housing 9.

Located next to the housing 9 is a gib block 21 in which is located a spring-loaded slider block 20, and a slider block 19. Probe elements 15 and 17 are located on the slider block 19.

A partial external thread 16 and 18 is formed in the forward end of each probe element 15 and 17 respectively. The partial external threads 16 and 18 form one complete thread when the probe elements 15 and 17 are assembled on slider block 19. The outside diameter of this external thread is only slightly smaller than the inside diameter of the threaded portion of the nut to tested allowing for tolerances.

A spring retainer block 23 is located at the end of the slider block 19, and affixed thereto. A bellcrank 27 is connected to the spring retainer block 23 by means of links and connectors 25.

Figure 2:
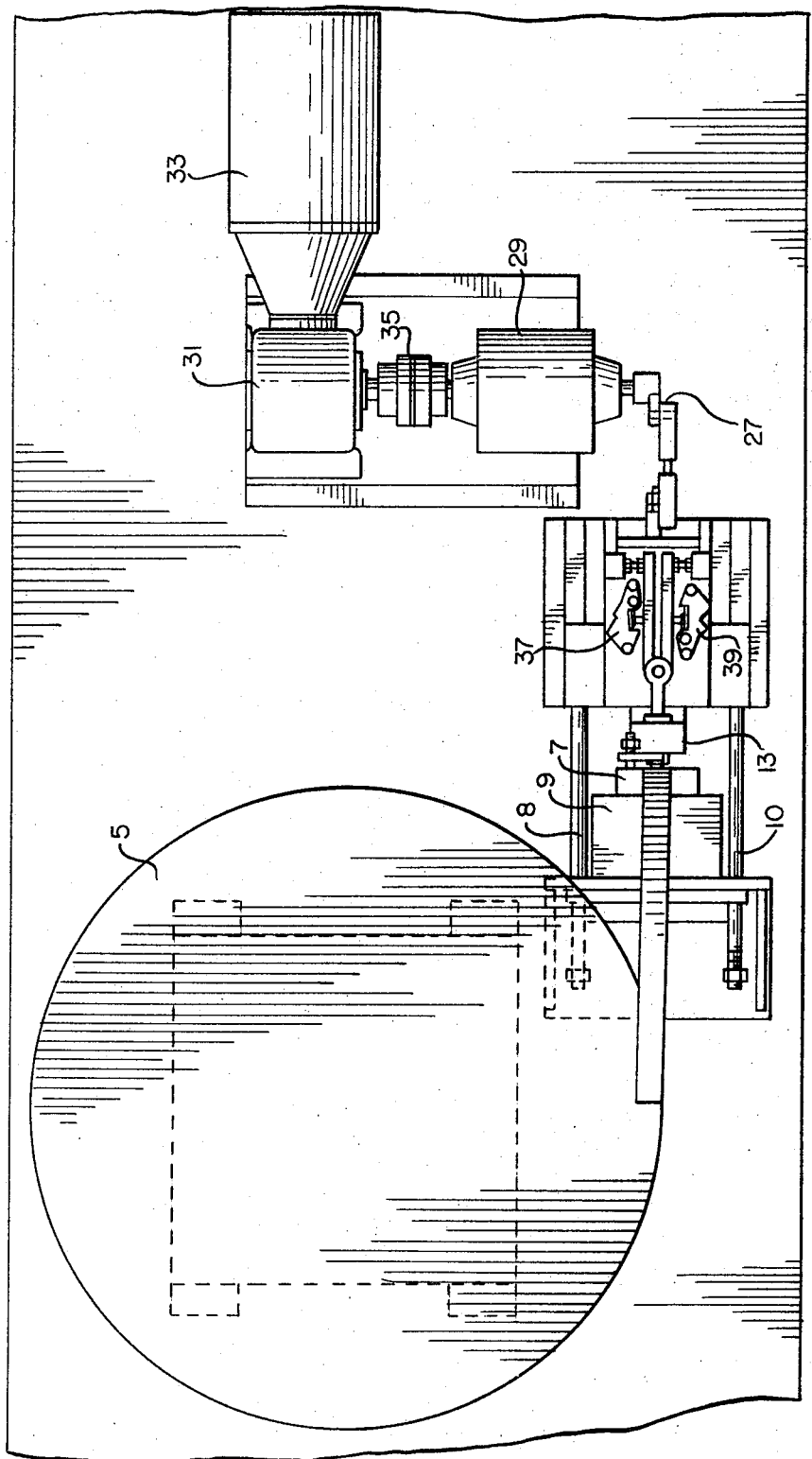
FIG. 2 illustrates a top view of the embodiment of the present invention which is depicted in FIG. 1.

With reference to FIG. 2, the escapement mechanism 11 is connected to, and activated by the rods 8 and 10 which are affixed to the slider block 19.

The bellcrank 27 is driven by a motor reducer 31 through a coupling 35 and clutch 29.

Figure 3:
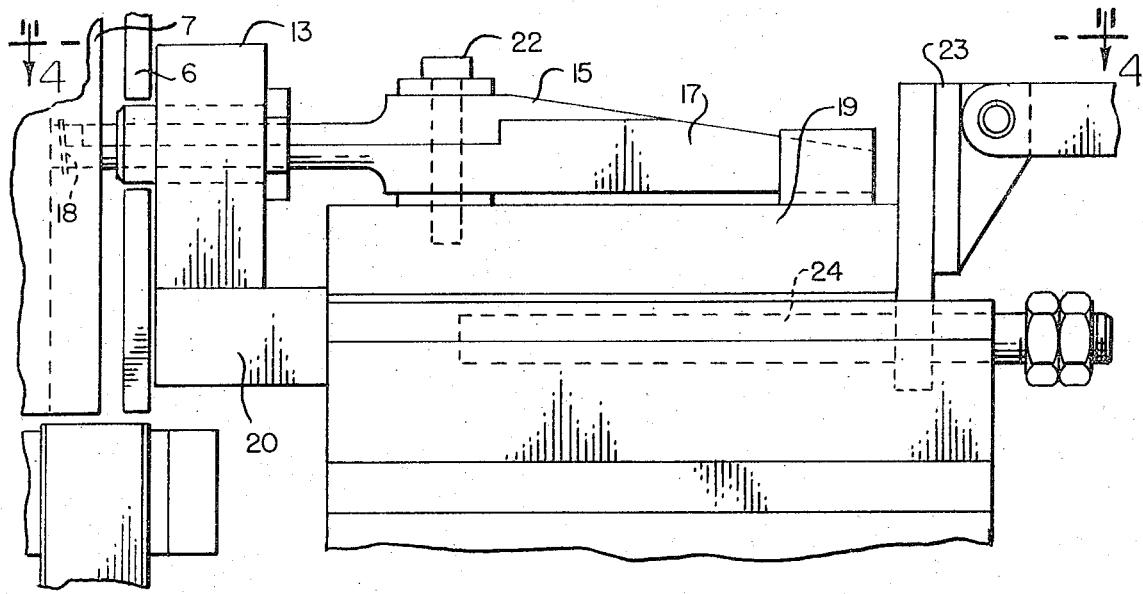
FIG. 3 illustrates an enlarged side view of the novel probe mechanism according to the present invention.

As best shown in FIG. 3, a locating block 13 is affixed to the spring loaded slider block 20, and is located between the probe elements 15 and 17, and the track 7 at the test station. The spring 24 is located interior to the spring loaded slider block 20.

Figure 4:
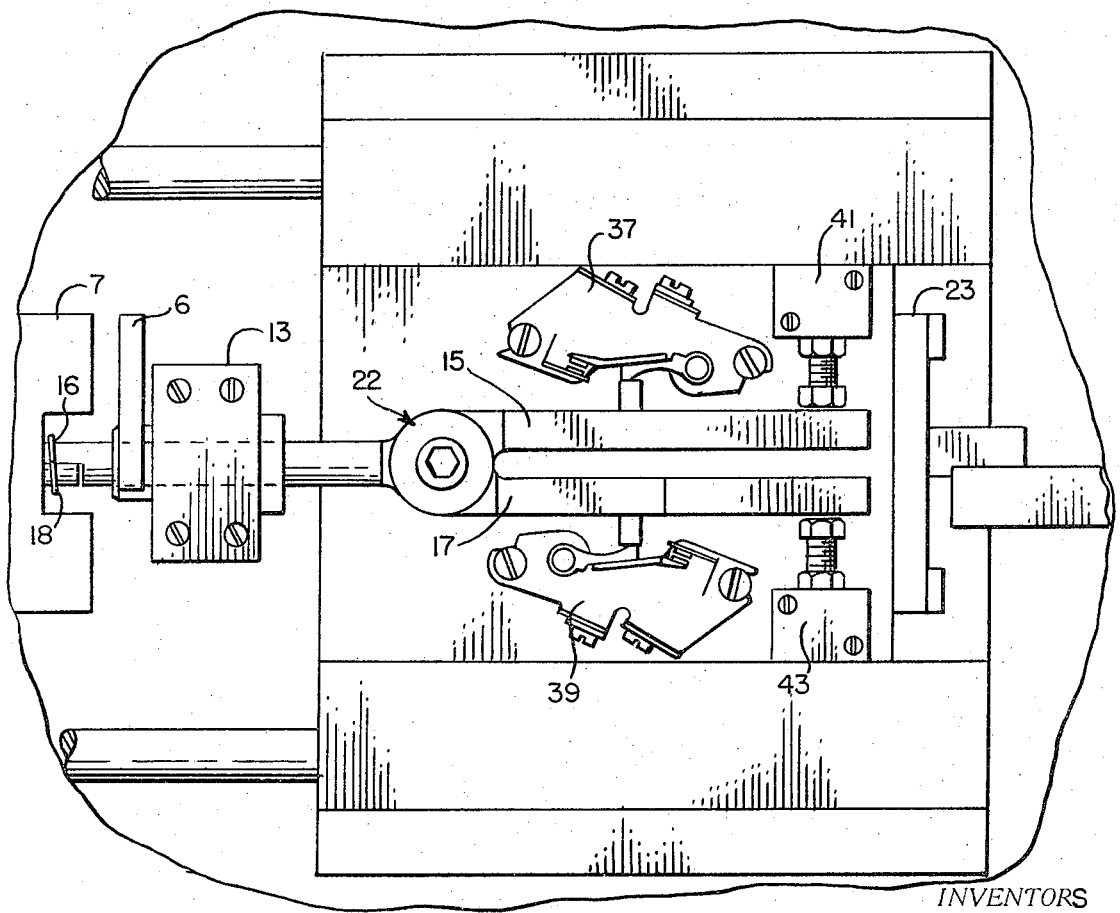
FIG. 4 illustrates an enlarged top view of the novel probe mechanism which is depicted in FIG. 3.

As best shown in FIG. 4, the probe elements 15 and 17 are located on the slider block 19, and affixed thereto by means of a common pivot element 22 positioned at approximately the mid-point along the length of the probe elements 15 and 17. Adjustable electric contact elements 37 and 39 are affixed to the slider block 19. The electric contact elements 37 and 39 are located adjacent to, and on either side of the probe elements 15 and 17 to the right of the pivot element 22. Limiting blocks 41 and 43 are affixed to the slider block 19, and located adjacent to, on either side of the probe elements 15 and 17 to the right of the electric contact points 37 and 39.

The nuts to be tested are loaded into the vibratory hopper 5 which discharges the nuts into the hardened steel track 7.

The bellcrank 27 imparts a translatory motion to the slider block 19. As the slider block 19 moves, the rods 8 and 10, connected to it, move the bottom gear rack 51 of the escapement mechanism 11. This motion of the gear rack 51 is transmitted by means of the pinion gears 49 and 53 and the pivoted link 55 to the gear racks 47, 48, and 52. This motion moves the bottom and top stop blocks 56 and 59 out of the track 7, and the stop blocks 57 and 58 into the track 7. Thus, the nut to be tested is isolated from the nuts above it in the steel track 7, and is free for ejection down the eject chute 12 after it has been tested.

The spring loaded slider block 20 moves with the slider block 19. The locating block 13 exerts a force against the nut to be tested, thereby holding it in the proper location for insertion of the probe elements 15 and 17. The spring 24 enables the locating block to come to a static position continually exerting a force on the nut to be tested, and allows the probe elements 15 and 17 to move through the locating block 13 and into the internal threaded portion of the nut being tested.

If the threads are flawed, the probe element 15 or 17 will contact and follow the contour of the flaw. This contact will displace the probe elements 15 or 17 causing them to pivot about the pivot element 22.

As the probe elements 15 or 17 move about the pivot element 22 they come into association with the electric contact element 37 or 39. A movement in the electric contact elements 37 or 39 energizes a solenoid connected to the eject chute 12 which then moves the eject chute 12 to the reject position. As the bellcrank 27 continues its rotation the spring loaded slider block 20, slider block 19 and probe elements 15 and 17 are moved away from the track 7. This extracts the probe elements 15 and 17 from the internally threaded portion of the nut being tested and allowing it to drop down through the eject chute 12 into a reject container.

This rotation of the bellcrank 27 also causes the bottom gear rack 51 of the escapement mechanism 11 to move back to its original position, thus, moving the bottom and top stops 56 and 59 into the track 7 and the two stops 57 and 58 out of the track 7 causing the nuts to index in the track 7 positioning the next nut for testing.

If there are no flaws in the internally threaded portion of the nut being tested no motion will be imparted to the probe elements 15 and 17 as they pass through the internally threaded portion of the nut. The probe elements 15 and 17 will not come into association with the electric contact points 37 and 39, thus, the electric solenoids connected to the eject chute 12 will not be energized. The eject chute 12 will remain in its normal accept position, and as the probe elements are extracted the nut will drop down into an accept container.

The above described events occur during one revolution of the bellcrank 27, thus one nut is tested per one revolution of the bellcrank 27.

As an example of an actual operable embodiment of the present invention which was constructed and placed in operation, the following brief description is set forth in light of the foregoing detailed description. The actual embodiment consisted of an apparatus for detecting any missing threads in 9/16–18 slotted hexagon nuts. The apparatus was mounted on a fabricated machine base which covered a floor area of approximately 24 inches wide by 60 inches long, and had a height of approximately 60 inches. The slotted hexagonal nuts were loaded into a 24-inch diameter vibratory hopper bowl 5 which discharged the nuts into a hardened steel track 7, which in turn led to an escapement unit 11. The vibratory hopper bowl 5 was mounted on a Syntron No.EB–1 base unit. A nut or parts detection switch was mounted in the hardened steel track 7 to control the starting and the stopping of a slider block 19 which is hereinafter sometimes referred to as a probe unit. When the slotted hexagonal nuts were loaded to the escapement mechanism 11, a mechanical actuator pulled the escapement mechanism 11 and placed a nut in position in front of the slider block or probe unit 19. The probe fingers or elements 15 and 17 are mounted on the slider block or probe unit 19. The probe fingers or elements 15 and 17 advance picking up the inside diameter of the hexagonal nut under test, and travel the full length of the nut. If any threads are missing, the probe fingers or elements 15 and/or 17 will expand and energize the reject solenoid to eject the bad nut.

When the slider block or probe unit 19 returns, a mechanical actuator pushes the escapement mechanism 11 back to its normal position and discharges the inspected nut down the steel track 7 and out the eject chute.

If the inspected nut was accepted, the reject chute will remain in its normal position and the nut will travel down the track to the accept container or pan.

The slider block or probe unit 19 was actuated by a spring-loaded slide or block 20 which was driven by a bellcrank wheel 27, a gear reduction motor or reducer 31 and a motor 33.

The apparatus according to the present invention can be used for detecting the shape and/or the dimensions of many types of articles in addition to internally threaded nuts. Moreover, the present invention contemplates embodiments wherein the article to be tested is translated linearly relative to a set of probe elements of fingers which undergo no linear translation.

The apparatus according to the present invention can also be adapted to detect the external shape and/or the external dimensions of an article, as well as the internal shape or dimensions thereof.

The common pivot element 22 referred to hereinabove is referred in the appended claims as "a first device". The phrase "third means" as used hereinafter in the appended claims may comprise various elements, including the slider block 19, the spring-loaded slider block 20, the bellcrank 27, the motor reducer 31, the coupling 35, the clutch 29, and the motor 33.

We claim:

1. An apparatus for detecting the shape and/or the dimensions of an article to be tested, comprising, in combination:
   a first probe element;
   a second probe element;
   a first device for interconnecting said first and second probe elements so that said probe elements may pivot with respect to each other;
   said first device being disposed between a first portion of said first probe element and second portion of said first probe element;
   said first device also being disposed between a first portion of said second probe element and a second portion of said second probe element;
   first means disposed adjacent said second portion of said first probe element for detecting the position of said second portion of said first probe element;
   second means disposed adjacent said second portion of said second probe element for detecting the position of said second portion of said second probe element; and
   third means for producing translatory motion between said article to be tested and said probe elements so that the first portions of said probe elements make substantially translatory contact with the portions of said article to be tested;
   whereby any pivotal movement or change in position of either of said first portions of said probe elements about said first device produces a corresponding movement or change in position of its associated second portion which is detected by its associated first or second means.

2. An apparatus characterized in accordance with claim 1, wherein said article to be tested includes an internally threaded aperture; said first portion of said first probe element includes a first partial external thread; said first portion of said second probe element includes a second partial external thread; said first and second partial threads forming a complete thread when said first portions of said probe elements are juxtaposed; and said complete thread makes translatory contact with the entire internally threaded aperture in response to said probe elements being moved by said third means.

3. An apparatus characterized in accordance with claim 1, wherein said first means comprises a first adjustable electrical contact detecting device; said second means comprises a second adjustable electrical contact detecting device; said third means includes a spring-loaded slide, a gear reduction motor and a bellcrank wheel; and including a probe unit upon which said probe elements are mounted; whereby said probe unit may be actuated to translate by said spring-loaded slide which is driven by said bellcrank wheel and said gear reduction motor.

4. An apparatus characterized in accordance with claim 1, including means for moving said first and second probe elements relative to said article to be tested while said article to be tested is held in a stationary position.

5. An apparatus characterized in accordance with claim 1, including means for translating said article to be tested relative to said first and second probe elements.

6. An apparatus characterized in accordance with claim 1, wherein said article to be tested is an internally threaded nut and said apparatus is employed to detect missing threads in said nut; including a probe unit upon which said first and second probe elements are mounted; said first portion of said first probe element includes a first partial external thread; said first portion of said second probe element includes a second partial external thread; said first partial external thread and said second partial external thread forming a complete thread when said first portion of said first probe element is juxtaposed relative to said first portion of said second probe element; said first means comprises a first adjustable electrical contact detecting device; said second means comprises a second adjustable electrical contact detecting device; said third means includes a spring-loaded slide, a gear reduction motor and a bellcrank wheel; said probe unit being actuated to translate relative to said internally threaded nut by said spring-loaded slide which is driven by said bellcrank wheel and said gear reduction motor; whereby said complete thread makes translatory contact with the entire internal threaded portion of said nut in response to said probe unit being moved by said third means.

* * * * *